United States Patent [19]

Mizuno et al.

[11] Patent Number: 5,165,621
[45] Date of Patent: Nov. 24, 1992

[54] TENSION REDUCTIVE SEAT BELT RETRACTOR FOR AUTOMOTIVE SAFETY BELT ARRANGEMENT WITH ENHANCED BELT RETRACTING PERFORMANCE

[75] Inventors: Yoshiyuki Mizuno; Toshihiko Warashina, both of Shizuoka, Japan

[73] Assignee: Fuji Kiko Company, Limited, Japan

[21] Appl. No.: 483,632

[22] Filed: Feb. 23, 1990

[30] Foreign Application Priority Data

Feb. 28, 1989 [JP] Japan ................. 1-23383[U]

[51] Int. Cl.⁵ ............................ B65H 75/48
[52] U.S. Cl. ........................ 242/107; 242/107.40 R
[58] Field of Search ......... 242/107, 107.4 R, 107.4 A, 242/107.6; 280/806, 807

[56] References Cited

U.S. PATENT DOCUMENTS

| | | | |
|---|---|---|---|
| 4,215,830 | 8/1980 | Cunningham | 242/107 |
| 4,301,977 | 11/1981 | Yang | 242/107 |
| 4,349,226 | 9/1982 | Kinaga | 242/107 X |
| 4,382,563 | 5/1983 | Morita et al. | 242/107 |
| 4,458,920 | 7/1984 | Ozaki . | |
| 4,483,494 | 11/1984 | Takada | 242/107 |
| 4,494,709 | 1/1985 | Takada | 242/107.6 |
| 4,568,037 | 2/1986 | Kawaguchi et al. | 242/107 |
| 4,691,875 | 9/1987 | Higbee . | |
| 4,913,372 | 4/1990 | Takada | 242/107 |

FOREIGN PATENT DOCUMENTS

| | | |
|---|---|---|
| 3732465 | 5/1988 | Fed. Rep. of Germany . |
| 53-20230 | 2/1978 | Japan .................. 242/107 |
| 1141147 | 6/1989 | Japan .................. 280/807 |
| 2195232 | 4/1988 | United Kingdom . |

Primary Examiner—Daniel P. Stodola
Assistant Examiner—John P. Darling
Attorney, Agent, or Firm—Ronald P. Kananen

[57] ABSTRACT

A reductive seat belt retractor for an automotive seat belt arrangement has a belt spool rotatably supported on a housing by a spool shaft which is rotatable with the belt spool in belt extracting and retracting directions. The spool shaft rigidly mounts a first gear for co-rotation therewith. A plurality of second gears are associated with the first gear for transmitting rotational torque therebetween. An internal gear is associated with the first and/or second gears for transmitting rotational torque therebetween, the internal gear being provided greater gear ratio versus the first gear. A ratchet wheel defining a spring receptacle chamber and a locking member associated with the ratchet wheel are provided for establishing and releasing locking of the ratchet wheel for preventing the ratchet wheel from rotating at least in the belt retracting direction. A solenoid is associated with the locking member for establishing locking engagement between the ratchet wheel and the locking member when a seat belt is worn by a passenger, and for releasing the locking engagement when the passenger takes off the seat belt. First and second springs disposed within the chamber are associated to each other in series. A spring force transmitting network includes a first force transmitting network active at unlocked position of the ratchet wheel and a second force transmitting network active at locking position of the ratchet wheel.

8 Claims, 9 Drawing Sheets

TENSION REDUCTIVE SEAT BELT RETRACTOR FOR AUTOMOTIVE SAFETY BELT ARRANGEMENT WITH ENHANCED BELT RETRACTING PERFORMANCE

BACKGROUND OF THE INVENTION

1. Field of the Invention

The present invention relates generally to an automotive safety belt arrangement. More specifically, the invention relates to a tension reductive belt retractor in the automotive safety belt arrangement.

2. Description of the Background Art

As is well known, safety belt arrangements of variety of constructions have been employed in automotive vehicles. In one of typical construction of the safety belt arrangements with a tension reducing capability, a tension reductive belt retractor is provided with a coil spring which serves for rewinding or retracting extra length of a belt for restricting passenger on a vehicular seat upon accident. The rewinding spring is housed within a retractor housing together with a belt locking mechanism and so forth. In the modern vehicle, requirement for compact construction of the belt retractor, the rewinding spring, the belt locking mechanism and so forth are housed within a limited spaced in the retractor housing. Because of the limited space in the retractor housing, it becomes difficult for avoiding interference between the rewinding spring and the adjacent components and/or the retractor housing.

If interference between the rewinding spring and the adjacent components and/or the retractor housing is caused, substantial wearing of the spring for earlier fatigue is caused for significantly shortening the lift of thesafety belt arrangement. Furthermore, such interference may lower rewinding performance of the belt for prolongate time required for completely rewinding the extra length of the belt for safely restricting the passenger on the vehicular seat. For this reason, the retractor housing has to be large enough to provide sufficient space for housing the rewinding spring and other components without causing mutual interference. This clearly prevents the belt retractor from being constructed compact enough as required in the modern vehicle.

SUMMARY OF THE INVENTION

Therefore, it is an object of the present invention to provide a safety belt arrangement with a tension reductive seat belt retractor which permits reduction of a seat belt retractor without causing possibility of interference between a rewinding spring and associated components of the belt retractor or a retractor housing.

According to one aspect of the invention, a tension reductive seat belt retractor for an automotive seat belt arrangement, comprises:

a belt spool rotatably supported on a housing by means of a spool shaft which is rotatable with the belt spool in belt extracting and retracting directions;

a first gear rigidly connected to the spool shaft for co-rotation therewith;

a plurality of second gears associated with the first gear for transmitting rotational torque therebetween; an internal gear associated with the first and/or second gears for transmitting rotational torque therebetween, the internal gear being provided greater gear ratio versus the first gear;

a ratchet wheel defining a spring receptacle chamber;

a locking member associated with the ratchet wheel for establishing and releasing locking of the ratchet wheel for preventing the ratchet wheel from rotating at least in the belt retracting direction;

a solenoid associated with the locking member for establishing locking engagement between the ratchet wheel and the locking member when a seal belt is wore by a passenger, and for releasing the locking engagement when the passenger takes off the seat belt;

first and second springs disposed within the chamber associated to each other in series;

a spring force transmitting network including a first force transmitting network active at unlocked position of the ratchet wheel for exerting spring force of the second spring to the spool shaft in the belt retracting direction, and a second force transmitting network active at locking position of the ratchet wheel for directly exerting spring force of the first spring to the spool shaft in belt retracting direction and exerting spring force of the first spring to the spool shaft via the internal gear so that spring force to be exerted on the spool shaft at the locking position of the ratchet wheel is smaller than that at the unlocking position of the ratchet wheel.

Preferably, the gear ratio of the internal gear and the first gear is 3:1. Also, in the preferred construction, the spring force of the first spring may be three times greater than the second spring.

The first force transmission network may comprise a spring shaft connected to the spool shaft for co-rotation therewith, the ratchet wheel on which associated with the first and second springs for receiving the spring forces thereof, and the second spring connected to the spring shaft at the other end for transmitting spring force of the first spring to the spring shaft via the ratchet wheel. Also, the second force transmission network may include a first route comprising a spring shaft connected to the spool shaft for co-rotation therewith, the second spring being connected to the ratchet wheel at one end and to the spring shaft at the other end, and a second route comprising the internal gear to which one end of the first spring which is connected to the ratchet wheel at the other end, is connected for transmitting the spring force of the first spring to the spool shaft via the internal gear, the second gear and the first gear.

In the preferred construction, the tension reductive seat belt retractor may further comprise a cover member fitted onto the ratchet wheel for co-rotation therewith for preventing at least one of the first and second springs from conflicting with the housing.

In the alternative embodiment, the first force transmission network comprises a roller rigidly coupled with a shaft extended from one of the second gear, the ratchet wheel on which associated with the first and second springs for receiving the spring forces thereof, and the second spring connected to the spring shaft at the other end for transmitting spring force of the first spring to the spring shaft via the ratchet wheel, the roller, the shaft, the second gear coupled with the shaft and the first gear. Also, the second force transmission network may include a first route comprising a roller rigidly coupled with a shaft extended from one of the second gear, the ratchet wheel on which associated with the first and second springs for receiving the spring forces thereof, and the second spring connected to the roller at the other end for transmitting spring force of the first spring to the roller via the ratchet wheel, the roller, the shaft, the second gear coupled with the shaft and the first gear and a second route comprising the internal gear to which one end of the first spring which is connected to the ratchet wheel at the other end, is connected for transmitting the spring force of the first spring to the spool shaft via the internal gear, the second gear and the first gear.

The tension reductive seat belt retractor further may comprise a cover member fitted onto the ratchet wheel for co-rotation therewith for preventing at least one of the first and second springs from conflicting with the housing.

BRIEF DESCRIPTION OF THE DRAWINGS

The present invention will be understood more fully from the detailed description of the invention and from the accompanying drawings of the preferred embodiments of the invention, which, however, should not be taken to limit the invention to the specific embodiment or embodiments, but are for explanation and understanding only.

In the drawings:

FIGS. 4(A) and 4(B) are illustration showing a cover employed in the first embodiment of the tension reductive seat belt retractor of FIG. 1, in which

FIGS. 5(A), 5(B) and 5(C) are illustration of a ratchet wheel employed in the tension reductive seat belt retractor, in which

FIGS. 9(A) and 9(B) are illustration showing a major component employed in the second embodiment of the tension reductive seat belt retractor of FIG. 6, in which

FIGS. 10(A) and 10(B) are illustration of a roller employed in the tension reductive seat belt retractor, in which

DESCRIPTION OF THE PREFERRED EMBODIMENT

Figure 1:
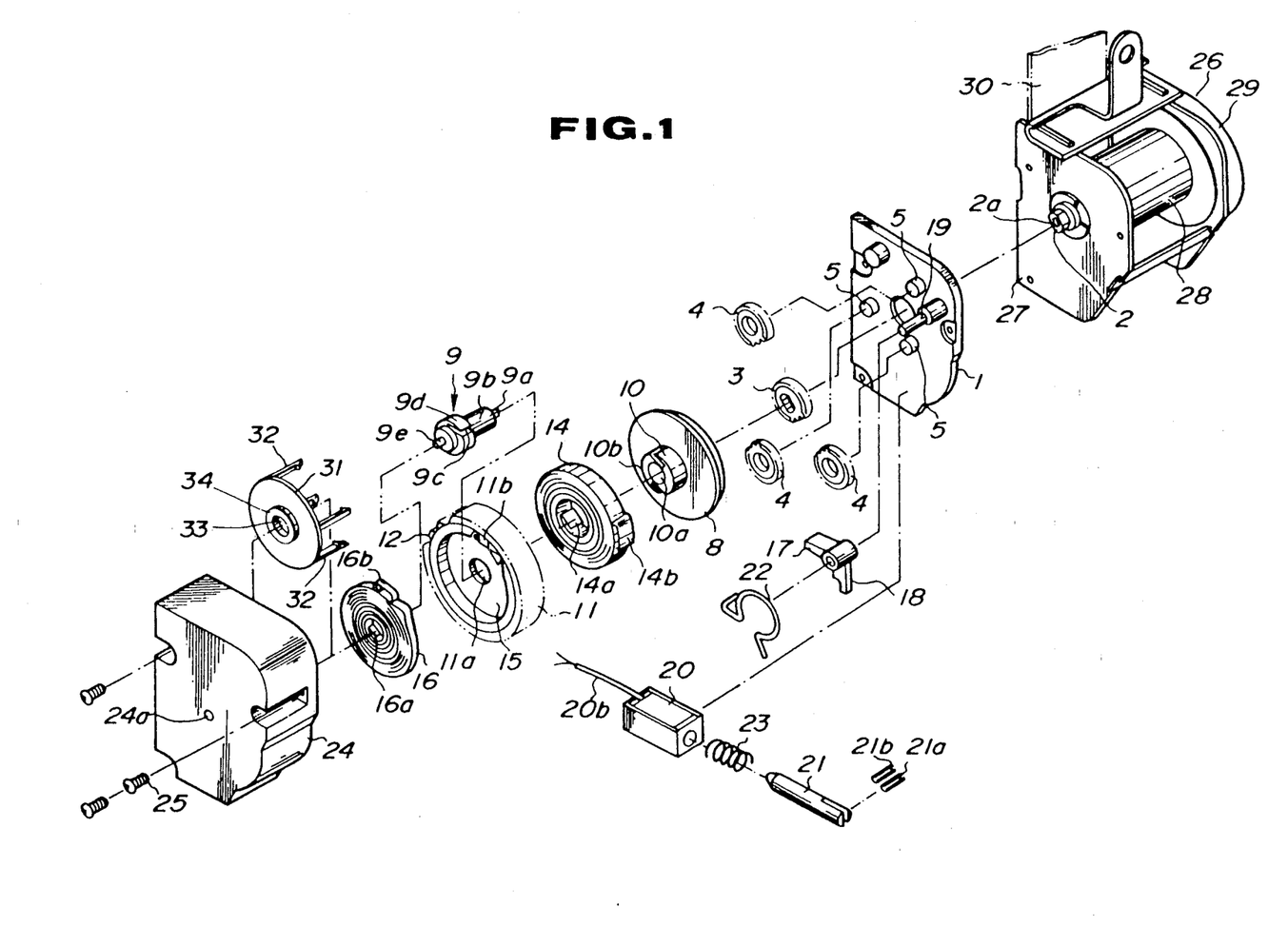
FIG. 1 is an exploded perspective view of the first embodiment of a tension reductive seat belt retractor according to the present invention, which is illustrated with partially removing components for the purpose of explanation or illustration.
Figure 2:
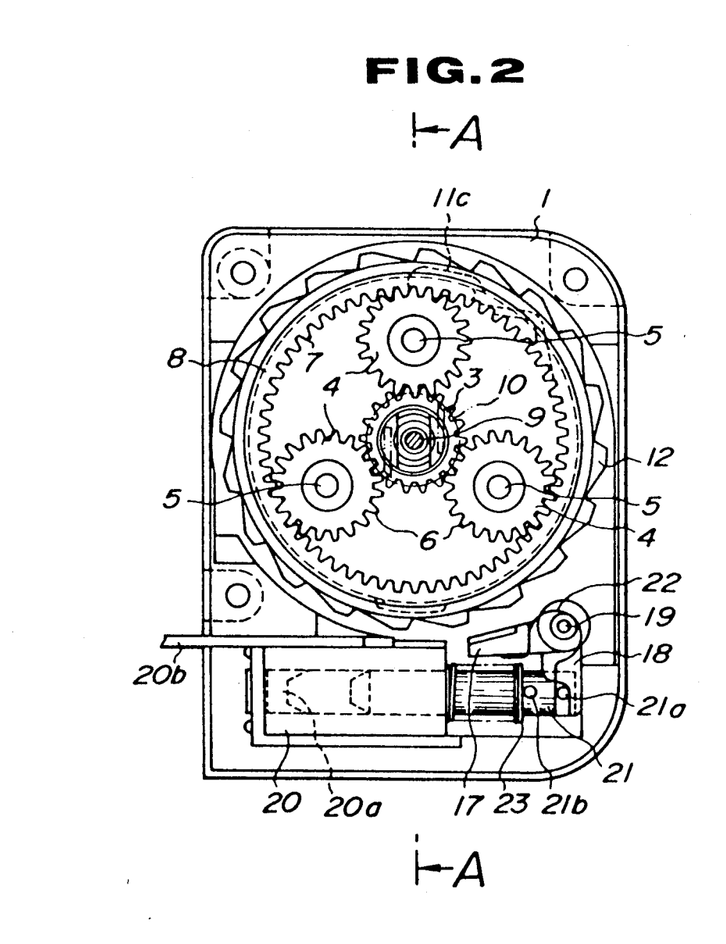
FIG. 2 is a side elevation of the first embodiment of the tension reductive seat belt retractor of FIG. 1.
Figure 3:
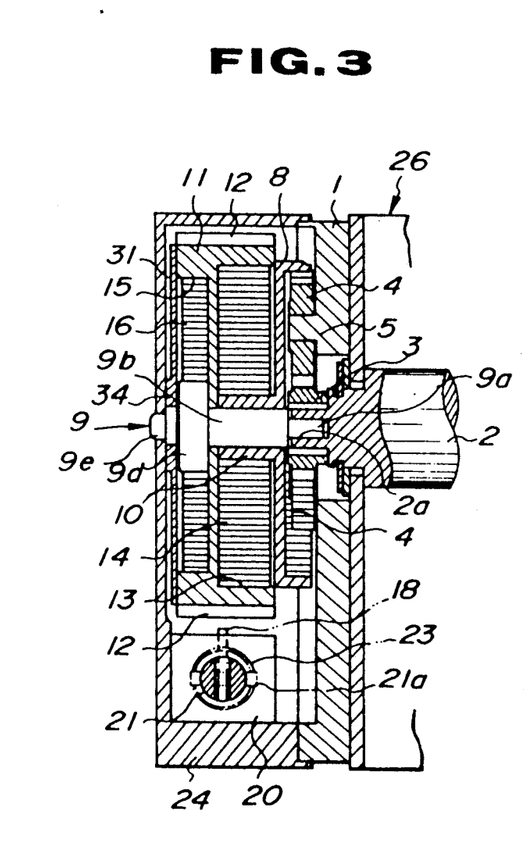
FIG. 3 is a section taken along line A—A of FIG. 2.
Figure 5A:
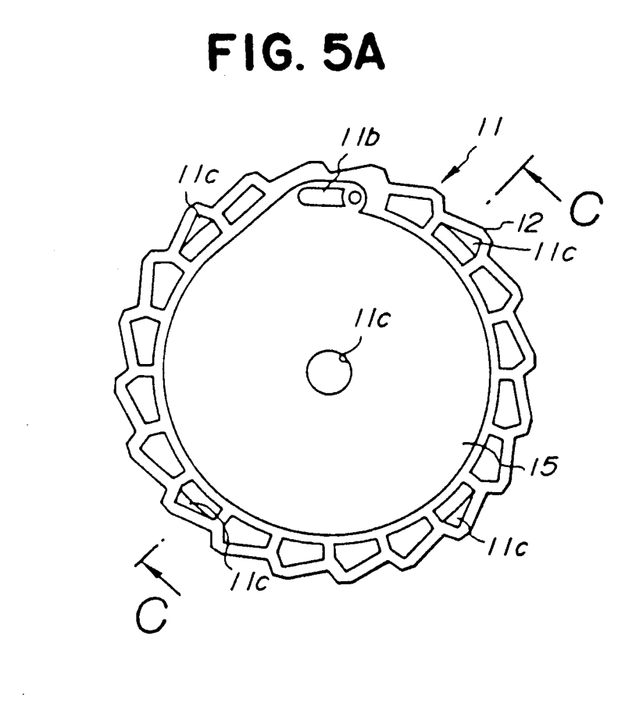
FIG. 5(A) is a front elevation of the ratchet wheel.
Figure 5B:
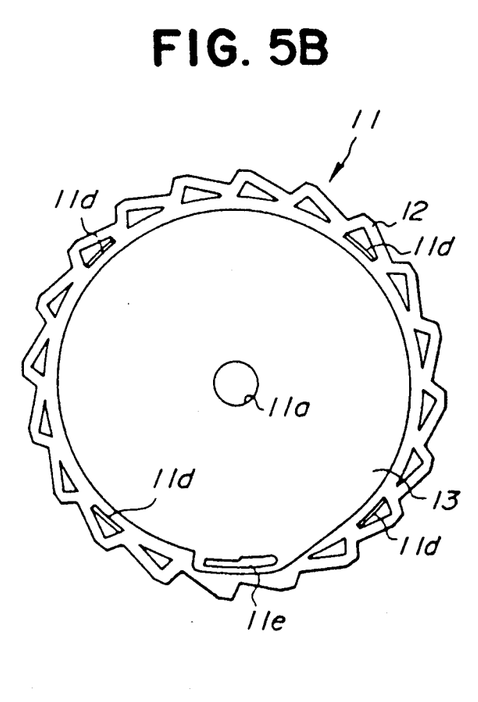
FIG. 5(B) is a back elevation of the ratchet wheel.
Figure 5C:
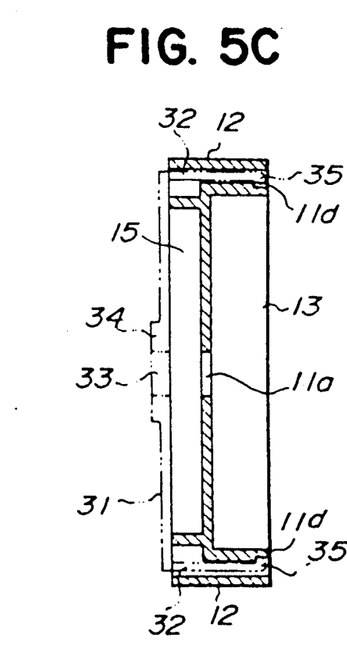
FIG. 5(C) is a section of the ratchet wheel taken along line C—C of FIG. 5(A)

Referring now to the drawings, particularly to FIGS. 1 through 3, the first embodiment of a tension reductive seat belt retractor includes a mounting base 1 which is rigidly secured on a belt spool housing 26 having side walls 27 and 29a, in which is rotatably supported a belt spool 28 with a flexible belt 30 wound therearound. A spool shaft 2 of the belt spool 28 is extended through the side wall 27 of the belt spool housing 26 and the mounting base 1. A first gear 3 is engaged to the spool shaft 2 for rotation therewith. Three second gears 4 are rotatably supported on gear shafts 5 extending from the mounting base 1. The second gears 4 are oriented with a regular intervals and respectively meshed with the first gear 3. An internal gear 8 with an internal gear teeth 7 is provided so that the internal gear teeth 7 is commonly engaged with the second gears 4. In the shown embodiment, the internal gear 8 is provided gear ratio of 3:1 versus the first gear 3. The internal gear 8 has a cylindrical center portion 10 having a bore 10a. A cut-out slit 10b is formed in the cylindrical central portion for receiving the inner end 14a of a first coil spring 14. A spring shaft 9 is loosely inserted through the bore 10a of the cylindrical center portion 10 of the internal gear 8 so as to rotatably support the internal gear. The spring shaft 9 has a rectangular end section 9a conforming with a rectangular boss 2a formed at the outer end of the belt spool shaft 2. With this construction, the spring shaft 9 is connected to the belt spool shaft 2 for rotation therewith. The spring shaft 9 has a shaft section 9b designed to be received within the cylindrical center position 10 with permitting rotation of the internal gear independent thereof. The spring shaft 9 further has a bulged section 9d which is formed with a cut-out slit 9c for receiving the inner end 16a of a second coil spring 16. Furthermore, the spring shaft 9 has a shaft portion 9e extending through a through opening 24a of a cover 24. A ratchet wheel 11 loosely receives the shaft section 9b of the spring shaft 9 through the center opening 11a so that it may rotate independently of the spring shaft. The ratchet wheel 11 is formed with ratchet teeth 12 on the outer periphery of the outer cylindrical wall section. The ratchet wheel defines two coil spring receptacle chambers 13 and 15 separated by the radially extending rib section for receiving the first and second coil springs 14 and 16 respectively. A spring receptacle groove 11e (FIG. 5B) is formed on the inner periphery of the outer cylindrical wall section of the ratchet wheel 11 for receiving the outer end 14b of the coil spring 14. The cylindrical wall section of the ratchet wheel 11 is further formed with a coil spring receptacle groove 11b for receiving the outer end 16b of the second coil spring 16. In the assembled position, the both of the first and second coil springs 14 and 16 are stored in the spring receptacle chambers 13 and 15 in pre-stressed fashion between the spring shaft 9.

In the shown embodiment, the second coil spring 16 has smaller spring force than that of the first coil spring 14. In the preferred construction, the spring force of the second coil spring 16 is set one third of the first coil spring 14. Therefore, the relative rotational torque to be exerted between the internal gear 8 and the ratchet wheel 11 is three times greater than that between the spring shaft 9 and the ratchet wheel 11.

An essentially L-shaped locking pawl lever 17 which has an integrally formed arm section 18 is pivotably supported on a pivot pin 19 which extends from the mounting base 1. The locking pawl lever 17 is cooperated with a bias spring 22 which exerts the locking pawl level toward locking position (clockwise in FIG. 1). The arm section 18 of the locking pawl lever 17 is associated with the outside of a spring pin 21a which is laterally extended from a plunger 21. The plunger 21 is associated with an electromagnetic solenoid 20 which has an electromagnet 20a. On the other hand, the plunger 21 is associated with a coil spring 23 which biases the plunger in a direction away from the solenoid 20. One end of the bias spring 22 is seated on the inside portion of the spring pin 21a and the other end is seated on the locking pawl lever 17 via the pivot pin 19, as shown in FIG. 2. The solenoid 20 is designed to place the locking pawl lever 17 in a position illustrated in FIG. 2 against the spring force of the bias spring 22 so that the locking pawl lever is placed away from the ratchet wheel 11 by the spring force exerted by the coil spring 23 for permitting rotation of the latter. On the other hand, when the solenoid 20 is energized, the plunger 21 is drawn against the spring force of the coil spring 23 toward the solenoid for permitting clockwise rotation by the spring force exerted by the bias spring 22. Therefore, locking engagement between the locking pawl lever 17 and the ratchet wheel 11 is established for blocking rotation of the latter.

Figures 4A, 4B:
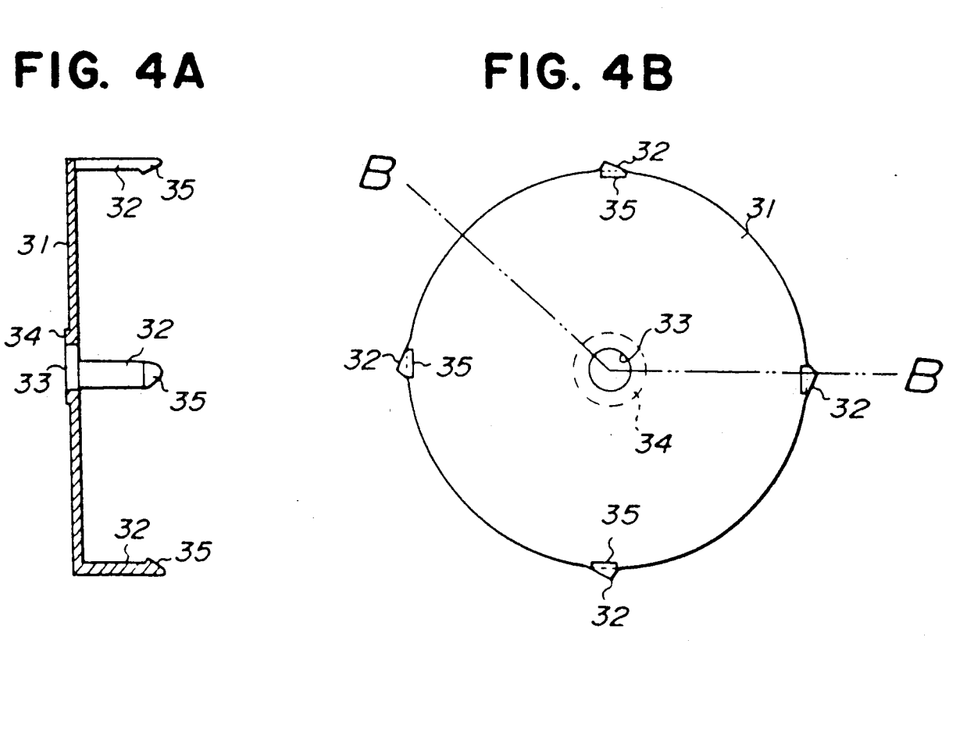
FIG. 4(A) shows a back elevation of the cover.
FIG. 4(B) shows a section taken along line B—B of FIG. 4(A)

The axial end of the ratchet wheel 11 at the side to which the second coil spring receptacle chamber 15, is covered by a cover disc 31. As can be seen from FIGS. 4(A) and 4(B), the cover disk 31 has axially extending legs 32 with regular circumferential intervals. The legs 32 are provided hooking head 35 for hooking engagement with the openings 11c (shown in FIGS. 5(A) and 5(B) of the ratchet wheel 11. The cover disc 31 is also formed with a center opening 33 for receiving the spring shaft 9. An annular projection 34 which serves as a spacer for defining a predetermined clearance from a cover 24 is formed along the circumferential edge of the center opening 33.

In the shown construction, the solenoid 20 is mounted on the mounting base 1. The solenoid 20 is electrically connected to a switch provided in a buckle (not shown) and detecting engagement of a belt tang thereto or a switch detecting door closure to turn ON.

It should be appreciated that the ratchet teeth 12 of the ratchet wheel 11 are so designed as to permit clockwise rotation over the ratchet teeth even after locking engagement is established, As shown in FIG. 1, the cover 24 is designed to receive all components set forth above and secured onto the mounting base 1 by means of a plurality of fastening bolts 25. As can be seen, an emergency locking mechanism 29 is provided at the opposite side of the belt spool housing 26. Any construction of the emergency locking mechanism which is responsive to vibration of the belt spool housing 26 or rapid extraction of the belt for locking the belt spool for restricting the passenger onto the vehicular seat.

In the foregoing construction, when the belt 30 is extracted, the spool shaft 2 is driven to rotate in belt extracting direction. Accordingly, the first gear 3 is driven to rotate in the belt extracting direction (in clockwise direction in FIG. 2). The rotation of the first gear 3 causes rotation of the second gears 4 in opposite direction (in counterclockwise direction in FIG. 2). The second gears 4 thus driven drives the internal gear 8 in the counterclockwise direction in FIG. 2.

On the other hand, according to clockwise rotation of the spool shaft 2, the spring shaft 9 also rotates in the clockwise direction in FIG. 2. The rotational torque of the spring shaft 9 is transmitted to the ratchet wheel 11 via the second coil spring 16 for causing clockwise rotation of the ratchet wheel. Since the second coil spring 16 is initially loaded to accumulate the spring force of greater magnitude than that of the first coil spring 14, the ratchet wheel 11 is driven in the clockwise direction. At the same time, since the internal gear 8 with carrying the inner end of the first coil spring 14, the first coil spring 14 is loaded to accumulate energy for causing counter-rotation of the components, which results in retraction of the belt 30.

After extracting necessary length of the belt 30, the switch is turned ON in response to establishing of engagement between the belt tang and the buckle or to closing of the door, to energize the solenoid 20. The solenoid 20 thus energized draws the plunger 21 against the spring force of the coil spring 23. This causes the locking lever 17 to pivot about the pivot pin 19 in clockwise direction for establishing locking engagement of the locking lever and the ratchet teeth 12 of the ratchet wheel 11. Therefore, the ratchet wheel 11 is prevented from rotation in counterclockwise direction.

When locking engagement between the ratchet wheel 11 and the locking lever 17 is established, the spring force of the second coil spring 16 is fully reacted by the ratchet wheel 11 so that all spring force thereof is exerted on the spool shaft 2 via the spring shaft 9. At the same time, all the spring force of the first coil spring 14 is transmitted to the internal gear 8, since the ratchet wheel 11 carrying the outer end thereof is locked. The spring force of the first coil spring 14 is thus transmitted to the first gear 3 via the second gears 4.

Since the gear ratio of the first gear 3 and the internal gear 8 is set at 1:3 as set forth above, and the ratio of spring coefficient of the first and second springs 14 and 16 are set at 3:1, the force ratio of the spring force to be exerted on the spool shaft from the first and second spring 14 and 16 become equal to each other. At the position where the ratchet wheel 11 is locked after extracting sufficient length of the belt 30, the spring force exerted to the spool shaft 2 by the second coil spring 16 via the spring shaft 9 is substantially small, e.g. approximately one fourth of the normally exerted spring force. On the other hand, because of the gear ratio, the spring force of the first coil spring 14 exerted on the spool shaft 2 is reduced to approximately one third ($\frac{1}{3}$). Since the first coil spring 14 is provided spring coefficient of three fourth ($\frac{3}{4}$) of that in the conventional retractor spring, the practically exerted spring force by first coil spring 14 becomes approximately one fourth of the conventional one. The combined spring force may thus become half of that exerted by the conventional retractor spring. Because of smaller spring force to be exerted on the spool shaft in the shown construction, the tension force to be exerted on the passenger via the belt becomes smaller for achieving wearing comfort.

At this position further extraction of the belt 30 is permitted by permitting clockwise rotation of the ratchet wheel 11 even when it is locked for prevention of counterclockwise rotation. Therefore, when it becomes necessary to further extract the belt for permitting the passenger's action or so forth, the belt can be further extracted with maintaining locking of the ratchet wheel. At this time, according to rotation of the ratchet wheel 11 in clockwise direction, the locking lever 17 is kicked by the ratchet teeth for causing pivotal movement in counterclockwise direction in FIG. 2 against the spring force exerted by the bias spring 22. During this activity, the plunger 21 stays at the drawn position and may not cause collision with the electromagnet 20a. Therefore, during the foregoing further extracting operation of the belt 30, no noise may be created.

When switch is turned OFF by releasing the belt tang from the buckle or by opening the door, the solenoid 20 is deenergized for permitting the plunger 21 to shift away therefrom by the spring force of the coil spring 23. This causes pivotal movement of the locking lever 17 in counterclockwise direction to release locking engagement between the locking lever and the ratchet wheel 11. Therefore, accumulated spring force is transferred to the spool shaft via the internal gear 8 and via the ratchet wheel 11 and the second coil spring 16 with causing loading of the second coil spring. Since the greater proportion of the spring force of the first coil spring 14 is transferred via the latter route, i.e. via the ratchet wheel and the second coil spring, the spool shaft 2 can be driven at greater spring force than that is exerted while the ratchet teeth is locked.

With the shown construction, since both opening of the spring receptacle chambers 13 and 15 are closed by the internal gear 8 and the cover disc 31 as can be clear from FIG. 3, offset of the first and second coil springs 14 and 16 can be successfully prevented. Furthermore, by the presence of the cover disc 31 which rotates together with the ratchet wheel, interference between the coil spring, particularly the second coil spring, and the cover 24 can be successfully prevented. Furthermore, by providing the annular projection 34 to maintain a given clearance between the mating surfaces of the cover disc 31 and the cover 24, face-to-face contact therebetween, which otherwise causes substantial resistance against the spool shaft rotation, can be successfully avoided.

FIGS. 6 to 9 show the second embodiment of the tension reductive seat belt retractor according to the present invention. In the shown construction, a spool shaft 102 of a belt spool 137, on which a belt 139 is wound, extends through one of side walls 136 of a belt spool housing 135. A mounting base 101 is fitted onto the side wall 136 of the belt spool housing 135. A first gear 103 is mounted on the outer end of the spool shaft 102 for rotation therewith. A central second gear 104 is provided for engagement with the first gear 103. The second gear 104 has a projecting pin 104a rotatably engaged with a through opening 101f formed through the mounting base 101. The second gear 104 also has a stem portion 105 with an essentially elliptic end portion 106. As shown in FIG. 8(A) and 8(B), the elliptic end portion 106 is separated by axially extending grooves 108 and formed with a hooking projections 109. The second gear 104 engages with a pair of third gears 103a which are rotatably mounted on pins 101b extending axially from the mounting base 101.

Similarly to the foregoing first embodiment, the internal gear 110 is provided a gear ratio versus the first gear 103 at 3:1.

Figure 10A:
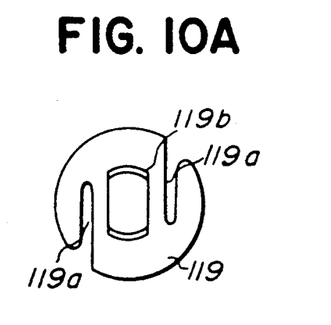
FIG. 10(A) is a front elevation of the roller wheel.
Figure 10B:
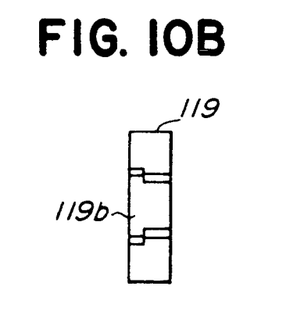
FIG. 10(B) is a side elevation of the roller.

The first gear 103 and the third gears 103a engages with an internal gear 110. The internal gear 110 has a center boss section 111 defining a center opening 112 through which the stem portion 105 of the second gear 104 extends for independent rotation to each other. A ratchet wheel 116 with an essentially cylindrical circumferential section 117 formed with ratchet teeth and a radially extending rib section 115a, is provided in axial alignment with the internal gear 110. The ratchet wheel 116 defines spring receptacle chambers at both axial sides of the rib 115a for receiving first and second coil springs 114 and 118. A roller 119 is disposed within the center opening of the second coil spring 118. As seen from FIGS. 10(A) and 10(B); the roller 119 is formed with cut-out slits 119a for receiving inner end 118a of the second coil spring 118. The inner end 114a of the first coil spring 114 is engaged to a cut-out slit 113 formed in the boss section 112. The outer ends 114b and 118b are respectively engaged into the inner periphery of the circumferential section 117 of the ratchet wheel 116. Opposing to the spring receptacle chamber for the second coil spring 118, a cover disc 120 is provided. The cover disc 120 has axially extending legs 122 with hooking ends 125. The legs 122 engage with through openings 117a formed through the ratchet teeth to assembly the cover disc 120 onto the ratchet wheel 116. The cover disc 120 is formed with a center opening 123 with a circumferentially extending annular projection 124.

Figure 6:
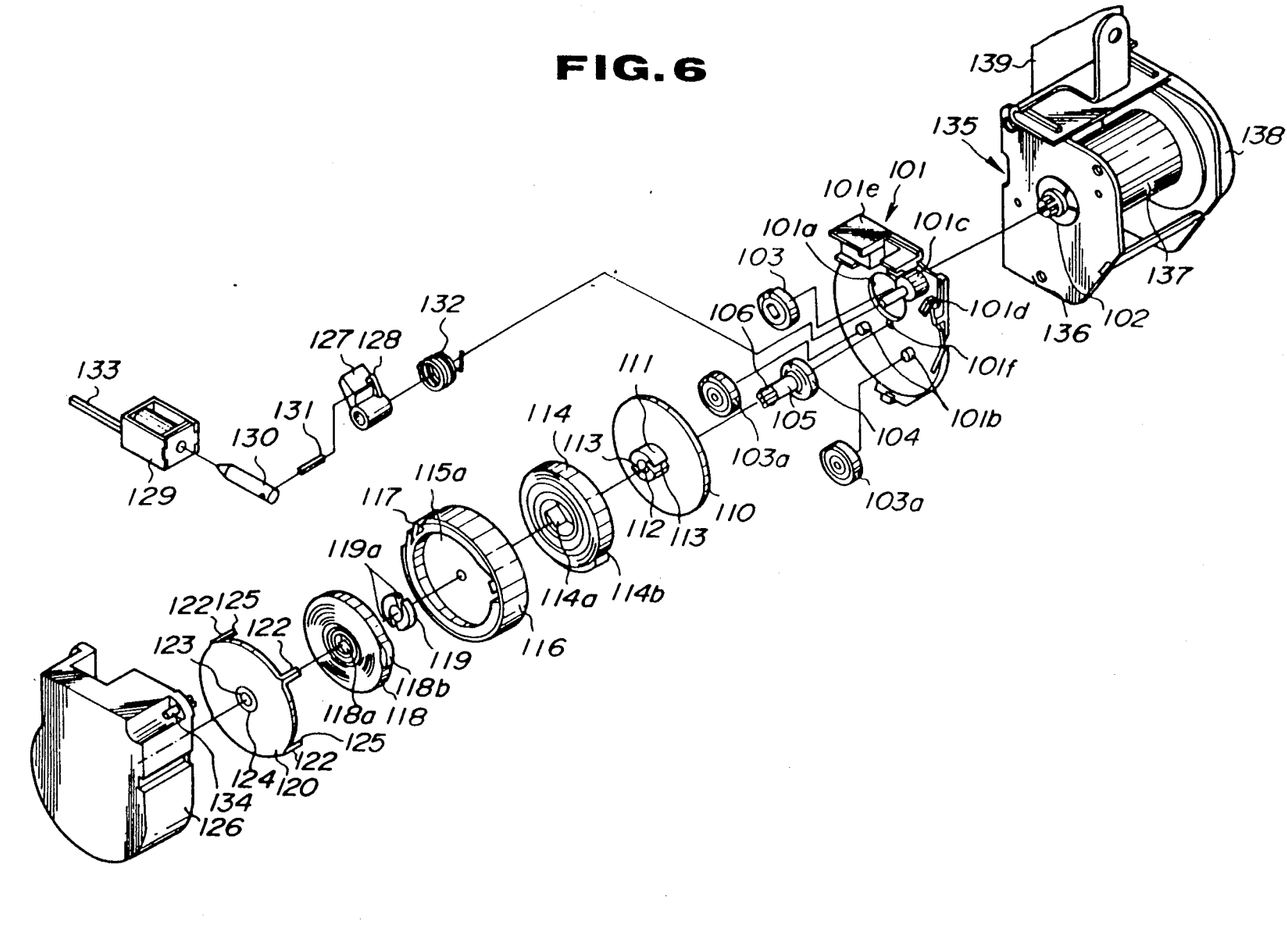
FIG. 6 is an exploded perspective view of the second embodiment of a tension reductive seat belt retractor according to the present invention, which is illustrated with partially removing components for the purpose of explanation or illustration.
Figure 7:
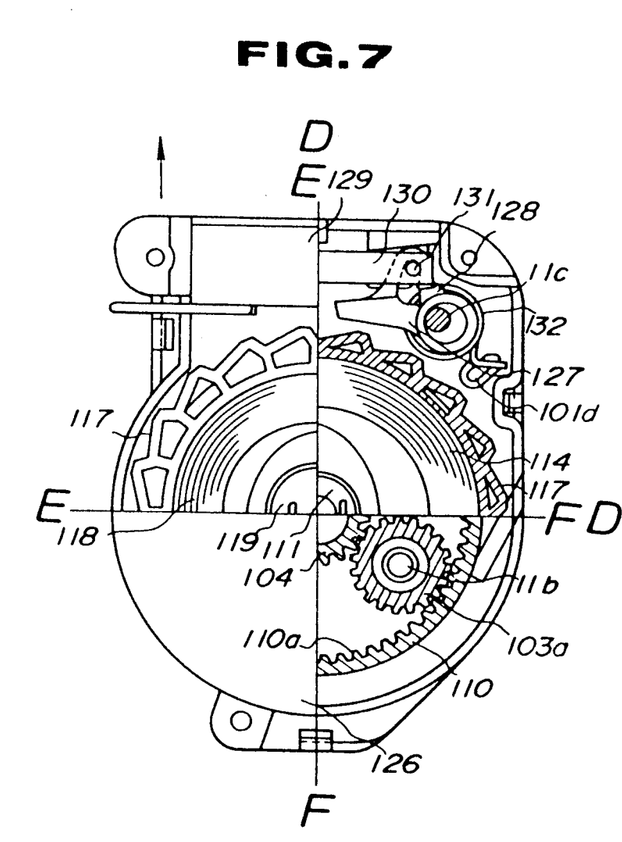
FIG. 7 is a side elevation of the second embodiment of the tension reductive seat belt retractor of FIG. 6.
Figure 8:
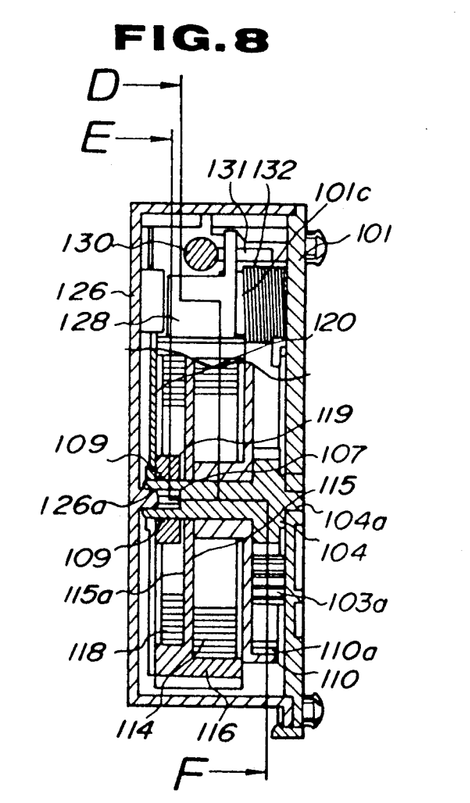
FIG. 8 is a section taken along lines D—D, E—E and F—F of FIG. 7.
Figure 9A:
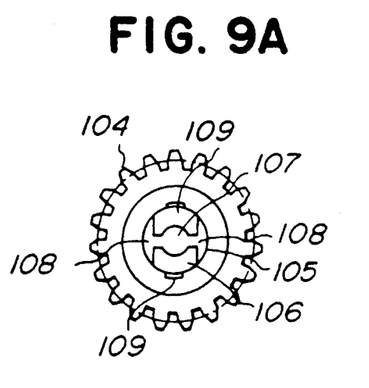
FIG. 9(A) shows a back elevation of the component.
Figure 9B:
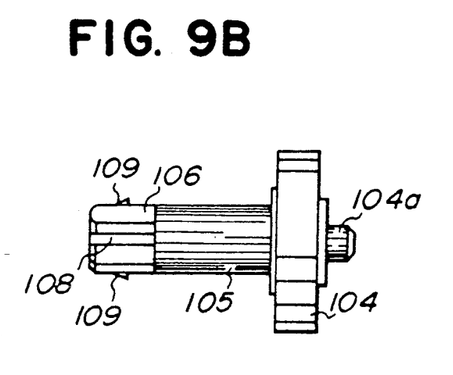
FIG. 9(B) shows a side elevation of the the component of FIG. 9(A)

In the vicinity of the ratchet wheel 116, a locking pawl 127 is provided. The locking pawl 127 has a cylindrical pivoting section 128 which pivotably engages with a pivot pin 101c with buldged base section 101c' extending from the mounting base 101. A torsion coil spring 132 is wound around the buldged base section 101c' of the pivot pin 101c. One end of the torsion coil spring 132 is rested on a spring hook 101d projecting from the mounting base 101. The other end of the torsion coil spring 132 is engaged to the locking pawl 127 for exerting biasing force in counterclockwise direction. The locking pawl 127 is integrally formed with a hook 128 which engages with a spring pin 131 extended from the outer end of a plunger 130. Similarly to the foregoing embodiment, the plunger 130 is associated with an electromagnetic solenoid 129 connected to a switch via a wiring 133. The solenoid 129 is supported on a horizontal extension 101e of the mounting base 101.

A cover 126 for receiving all components listed hereabove is secured onto the mounting base by means of fastening members 134. The cover 26 has a projection 126a. The projection 126a is designed to rotatably support the elliptic end section 106 of the stem portion 105 of the second gear 104.

As can be seen herefrom, the shown second embodiment is differentiated from the foregoing first embodiment in that the spring shaft in the former embodiment is replaced with the roller 119 and in that the first gear 103 co-rotatable with the spool shaft 102 is direct engagement with the internal gear 108. However, with the shown second embodiment, substantially equivalent tension reduction and avoidance of interference as that achieved by the former embodiment can be achieved.

Figure 11:
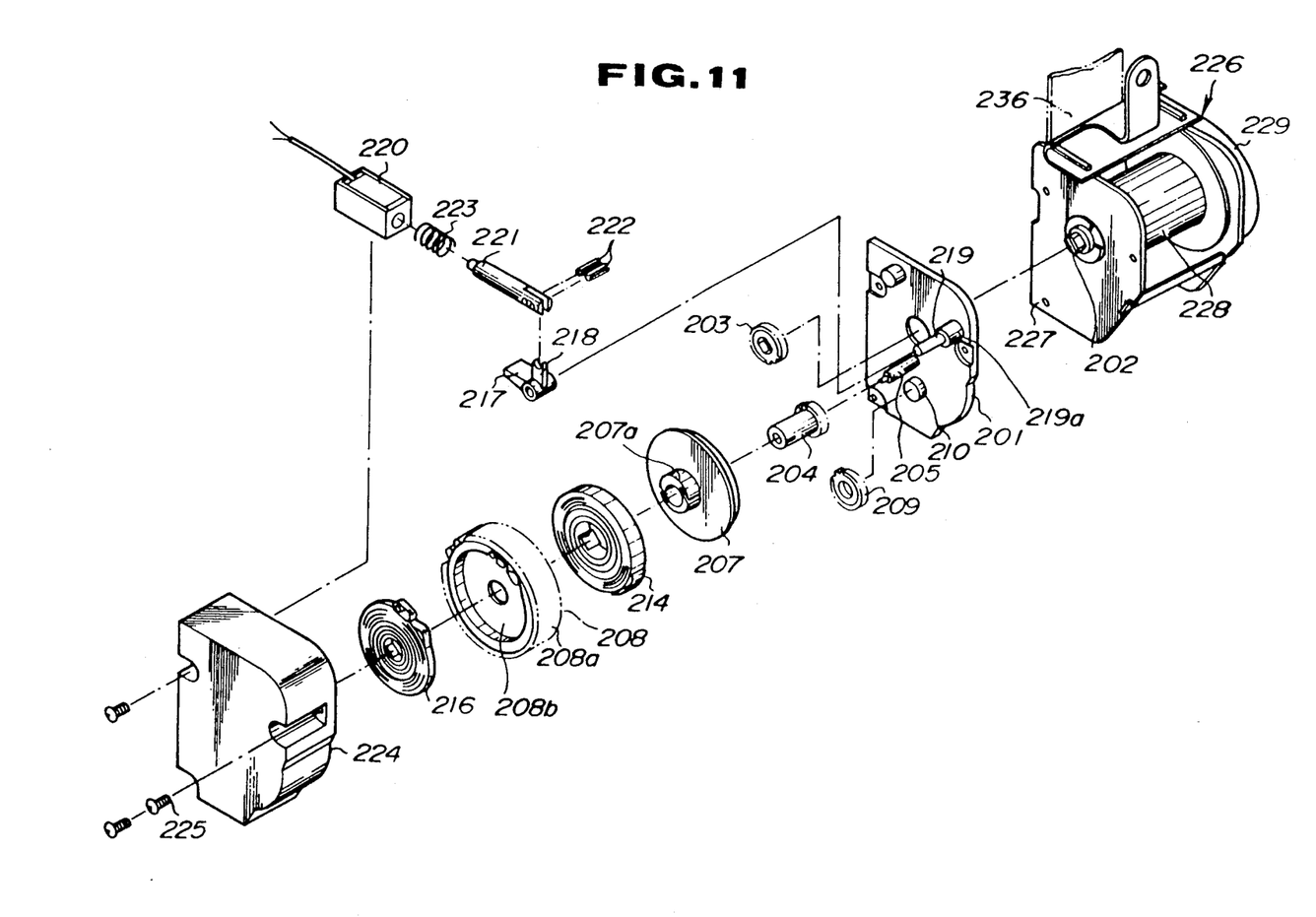
FIG. 11 is an exploded perspective view of the third embodiment of a tension reductive seat belt retractor according to the present invention, which is illustrated with partially removing components for the purpose of explanation or illustration.
Figure 12:
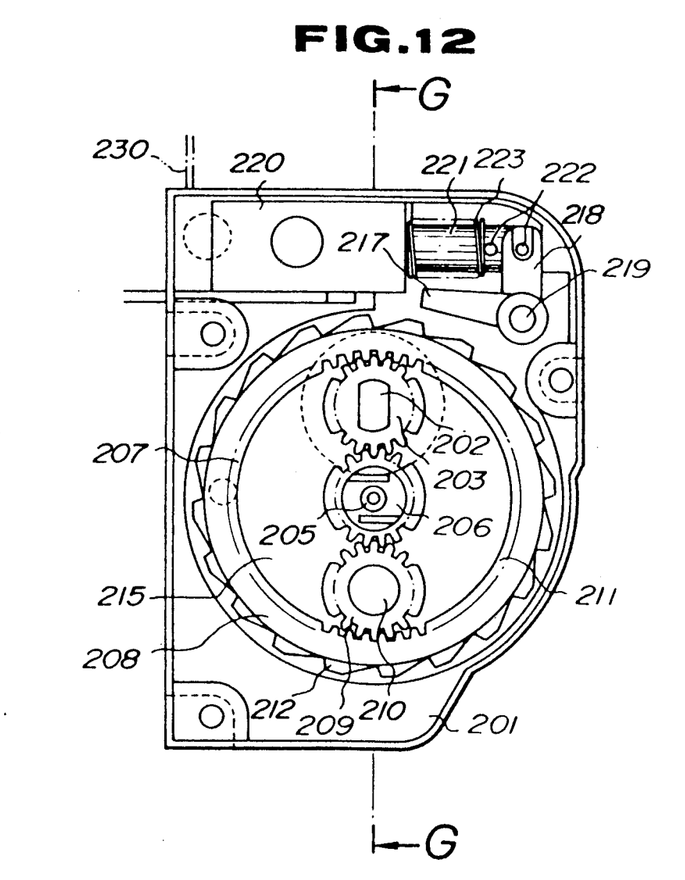
FIG. 12 is a side elevation of the third embodiment of the tension reductive seat belt retractor of FIG. 11.
Figure 13:
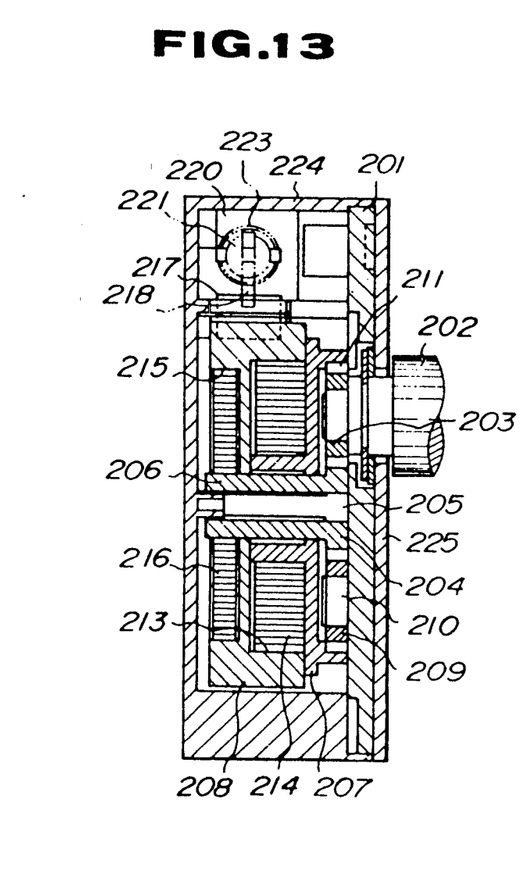
FIG. 13 is a section taken along line G—G of FIG. 12.

FIGS. 11 to 13 show the third embodiment of the tension reductive seat belt retractor according to the present invention. In the shown construction, a spool shaft 202 of a belt spool 228, on which a belt 226 is wound, extends through one of side walls 227 of a belt spool housing 226. A mounting base 201 is fitted onto the side wall 227 of the belt spool housing 226. A first gear 203 is mounted on the outer end of the spool shaft 202 for rotation therewith. A central second gear 204 is provided for engagement with the first gear 203. The second gear 204 is rotatably mounted on a gear shaft 205 extending from the mounting base 201. The second gear 204 also has a stem portion 206 with an end portion which is separated by axially extending grooves. The second gear 204 engages with a third gears 209 which are rotatably mounted on a pin 210 extending axially from the mounting base 201. The first and third gears 203 and 209 are engaged with an internal gear 207.

Similarly to the foregoing embodiments, the internal gear 207 is provided a gear ratio versus the first gear 203 at 3:1.

The internal gear 207 has a center boss section 207a defining a center opening through which the stem portion 206 of the second gear 204 extends for independent rotation to each other. A ratchet wheel 208 with an essentially cylindrical circumferential section 208a formed with ratchet teeth and a radially extending rib section 208b, is provided in axial alignment with the internal gear 208. The ratchet wheel 208 defines spring receptacle chambers at both axial sides of the rib 208b for receiving first and second coil springs 214 and 216. The inner end of the second coil spring 216 is engaged with the groove at the end of the stem portion 106 of the second gear 204. The inner end of the first coil spring 214 is engaged to a cut-out slit 213 formed in the boss section 212. The outer ends are respectively engaged into the inner periphery of the circumferential section 217 of the ratchet wheel 208.

In the vicinity of the ratchet wheel 208, a locking pawl 217 is provided. The locking pawl 217 has a cylindrical pivoting section which pivotably engages with a pivot pin 219 with buldged base section 219a extending from the mounting base 201. The locking pawl 217 is integrally formed with a hook 218 which engages with a spring pin 222 extended from the outer end of a plunger 221. The plunger 221 is biased in a direction to pivot the locking pawl 217 for placing away from the ratchet teeth of the ratchet wheel 208. Similarly to the foregoing embodiment, the plunger 221 is associated with an electromagnetic solenoid 220 connected to a switch via a wiring.

A cover 224 for receiving all components listed hereabove is secured onto the mounting base by means of fastening screws or bolts 225. The cover 26 has a projecting boss section. The projecting boss section is designed to rotatably support the end portion of the gear shaft 205.

The shown third embodiment will be appreciated as simplified form of the foregoing first embodiment by replacing the spring shaft with the stem portion 206 of the second gear 204. However, the shown embodiment achieves the equivalent advantages in reduction of tension while the seat belt is worn.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A tension reductive seat belt retractor for an automotive seat belt arrangement, comprising:
   a belt spool rotatably supported on a housing by means of a spool shaft which is rotatable with said belt spool in belt extracting and retracting directions;
   a first gear rigidly connected to said spool shaft for co-rotation with said spool shaft;
   a plurality of second gears in meshing engagement with said first gear for transmitting rotational torque therebetween so that said second gears rotate in a direction opposite to the direction of rotation of said first gear;
   an internal gear in meshing engagement with said second gears for transmitting rotational torque therebetween, said internal gear being provided with a greater gear ratio versus said first gear;
   a ratchet wheel defining a spring receptacle chamber;
   a locking member associated with said ratchet wheel for establishing and releasing locking of said ratchet wheel for preventing said ratchet wheel from rotating at least in said belt retracting direction;
   a solenoid associated with said locking member for establishing locking engagement between said ratchet wheel, and said locking member when a seat belt is worn by a passenger, and for releasing the locking engagement when the passenger takes off the seat belt;
   first and second springs disposed within said chamber associated to each other in series;
   a spring force transmitting network including a first force transmitting network active at unlocked position of said ratchet wheel for exerting a spring force of said second spring to said spool shaft in said belt retracting direction, and a second force transmitting network active at a locking position of said ratchet wheel for directly exerting a spring force of said first spring to said spool shaft in a belt retracting direction and exerting a spring force of said first spring to said spool shaft via said internal gear so that the spring force to be exerted on said spool shaft at the locking position of said ratchet wheel is smaller than that at said unlocking position of said ratchet wheel;
   wherein said second force transmission network includes a first route comprising a spring shaft connected to said spool shaft for co-rotation with said spool shaft, said second spring being connected to said ratchet wheel at one end and to said spring shaft at the other end, and a second route comprising said internal gear, said first spring being connected to said internal gear at one end and being connected to said ratchet wheel at the other end for transmitting the spring force of said first spring to said spool shaft via said internal gear, said second gear and said first gear.

2. A tension reductive seat belt retractor for an automotive seat belt arrangement, comprising:
   a belt spool rotatably supported on a housing by means of a spool shaft which is rotatable with said belt spool in belt extracting and retracting directions;
   a first gear rigidly connected to said spool shaft for co-rotation with said spool shaft;
   a plurality of second gears in meshing engagement with said first gear for transmitting rotational torque therebetween so that said second gears rotate in a direction opposite to the direction of rotation of said first gear;

an internal gear in meshing engagement with said gears for transmitting rotational torque therebetween, said internal gear being provided with a greater gear ratio versus first gear;

a ratchet wheel defining a spring receptacle chamber;

a locking member associated with said ratchet wheel for establishing and releasing locking of said ratchet wheel for preventing said ratchet wheel from rotating at least in said belt retracting direction;

a solenoid associated with said locking member for establishing locking engagement between said ratchet wheel and said locking member when a seat belt is worn by a passenger, and for releasing the locking engagement when the passenger takes off the seat belt;

forst and second springs disposed within said chamber associated to each other in series;

a spring force transmitting network including a first force transmitting network active at an unlocked position of said ratchet wheel for exerting a spring force of said second spring to said spool shaft in said belt retracting direction, and a second force transmitting network active at a locking position of said ratchet wheel for directly exerting a spring force of said first spring to said spool shaft in a belt retracting direction and exerting a spring force of said first spring to said spool shaft via said internal gear so that spring force to be exerted on said spool shaft at the locking position of said ratchet wheel is smaller than that at said unlocking position of said ratchet wheel;

wherein said first force transmission network comprises a spring shaft connected to said spool shaft for co-rotation with said spool shaft, wherein said ratchet wheel is operatively positioned with respect to said first and second springs for receiving the spring forces thereof, and said second spring is connected to an end of said spring shaft for transmitting a spring force of said first spring to said spring shaft via said ratchet wheel;

wherein said second force transmission network includes a first route comprising a spring shaft connected to said spool shaft for co-rotation with said spool shaft, said second spring being connected to said ratchet wheel at one end and to said spring shaft at the other end, and a second route comprising said internal gear of said forst spring being connected to said internal gear at one end and being connected to said ratchet wheel at the other end for transmitting the spring force of said first spring to said spool shaft via said internal gear, said second gears and said first gear.

3. A tension reductive seat belt retractor as set forth in claim 2, further comprising a cover member fitted onto said ratchet wheel for co-rotation with said ratchet wheel for preventing at least one of said first and second springs from conflicting with said housing.

4. A tension reductive seat belt retractor for an automotive seat belt arrangement, comprising:

a belt spool rotatably supported on a housing by means of a spool shaft which is rotatable with said belt spool in belt extracting and retracting directions;

a first gear rigidly connected to said spool shaft for co-rotation with said spool shaft;

a plurality of second gears engageable with said first gear for transmitting rotational torque therebetween so that said second gears rotate in a direction opposite to the direction of rotation of said first gear;

an internal gear in meshing engagement with said second gears for transmitting rotational torque therebetween, said internal gear being provided with a greater gear ratio versus said first gear;

a ratchet wheel defining a spring receptacle chamber;

a locking member associated with said ratchet wheel for establishing and releasing locking of said ratchet wheel for preventing said ratchet wheel from rotating at least in said belt retracting direction;

a solenoid associated with said locking member for establishing locking engagement between said ratchet wheel and said locking member when a seat belt is worn by a passenger, and for releasing the locking engagement when the passenger takes off the seat belt;

first and second springs disposed within said chamber associated to each other in series;

a spring force transmitting network including a first force transmitting network active at an unlocked position of said ratchet wheel for exerting a spring force of said second spring to said spool shaft in said belt retracting direction, and a second force transmitting network active at a locking position of said ratchet wheel for directly exerting a spring force of said first spring to said spool shaft in a belt retracting direction and exerting a spring force of said first spring to said spool shaft via said internal gear so that spring force to be exerted on said spool shaft at the locking position of said ratchet wheel is smaller than that at said unlocking position of said ratchet wheel;

wherein said first force transmission network comprises a roller coupled for rotation with a shaft extended from one of said second gears, said ratchet wheel is operatively positioned with respect to said first and second springs for receiving the spring forces thereof, and said second spring connected to an end of a spring shaft for transmitting the spring force of said first spring to said spring shaft via said ratchet wheel, said roller, said shaft, said second gear coupled with said shaft and said first gear.

5. A tension reductive seat belt retractor as set forth in claim 4, wherein said second force transmission network includes a first route comprising said roller connected to said spool shaft for co-rotation with said spool shaft said second spring being connected to said ratchet wheel at one end and to said roller at the other end, and a second route comprising said internal gear to which one end of said first spring which is connected to said ratchet wheel at the other end, is connected for transmitting the spring force of said first spring to said spool shaft via said internal gear, said second gear and said first gear.

6. A tension reductive seat belt retractor as set forth in claim 5, which further comprises, a cover member fitted onto said ratchet wheel for co-rotation with said ratchet wheel for preventing at least one of said first and second springs from conflicting with said housing.

7. A tension reductive seat belt retractor as set forth in claim 4, which further comprises a cover member fitted onto said ratchet wheel for co-rotation with said ratchet wheel for preventing at least one of said first and second springs from conflicting with said housing.

8. A tension reductive seat belt retractor for an automotive seat belt arrangement, comprising:
- a belt spool rotatably supported on a housing by means of a spool shaft which is rotatable with said belt spool in belt extracting and retracting directions;
- a first gear rigidly connected to said spool shaft for co-rotation with said spool shaft;
- a plurality of second gears engageable with said first gear for transmitting rotational torque therebetween so that said second gears rotate in a direction opposite to the direction of rotation of said first gear;
- an internal gear in meshing engagement with said second gears for transmitting rotational torque therebetween, said internal gear being provided with a greater gear ratio versus said first gear;
- a ratchet wheel defining a spring receptacle chamber;
- a locking member associated with said ratchet wheel for establishing and releasing locking of said ratchet wheel for preventing said ratchet wheel from rotating at least in said belt retracting direction;
- a solenoid associated with said locking member for establishing locking engagement between said ratchet wheel and said locking member when a seat belt is worn by a passenger, and for releasing the locking engagement when the passenger takes off the seat belt;
- first and second springs disposed within said chamber associated to each other in series;
- a spring force transmitting network including a first force transmitting network active at an unlocked position of said ratchet wheel for exerting a spring force of said second spring to said spool shaft in said belt retracting direction, and a second force transmitting network active at a locking position of said ratchet wheel for directly exerting spring forces of said first spring to said spool shaft in said belt retracting direction and exerting a spring force of said first spring to said spool shaft via said internal gear so that spring force to be exerted on said spool shaft at the locking position of said ratchet wheel is smaller than that at said unlocking position of said ratchet wheel;
- wherein said second force transmission network includes a first route comprising a roller coupled for rotation with a shaft extended from one of said second gears, said ratchet wheel is operatively positioned with respect to said first and second springs for receiving the spring forces thereof, and said second spring connected to an end of said roller for transmitting spring force of said first spring to said roller via said ratchet wheel, said roller, said shaft, said second gear coupled with said shaft and said first gear and a second route comprising said internal gear, said first spring being connected to said internal gear at one end and being connected to said ratchet wheel at the other end for transmitting the spring force of said first spring to said spool shaft via said internal gear, said second gears and said first gear.

* * * * *